United States Patent [19]

Heinlein

[11] 4,097,174

[45] Jun. 27, 1978

[54] MILLING CUTTER

[75] Inventor: Werner Heinlein, Lichtenau, Germany

[73] Assignee: Hans Heinlein, Zirndorf bei Nuremberg, Germany

[21] Appl. No.: 740,077

[22] Filed: Nov. 8, 1976

[30] Foreign Application Priority Data

Sep. 4, 1976 Germany .............................. 2639890

[51] Int. Cl.² ............................................. B26D 1/12
[52] U.S. Cl. ........................................ 407/46; 407/56; 407/72
[58] Field of Search ................. 29/105 R, 96; 407/33, 407/46, 47, 49, 51, 55, 56, 72

[56] References Cited

U.S. PATENT DOCUMENTS 605,013  5/1900  Hunter ................................ 29/105 R

FOREIGN PATENT DOCUMENTS

| 133,200 | 8/1902 | Germany ............................ 29/105 R |
| 603,133 | 9/1934 | Germany ............................ 29/105 R |
| 37,257  | 8/1906 | Switzerland ....................... 29/105 R |

Primary Examiner—Harrison L. Hinson
Attorney, Agent, or Firm—Browdy and Neimark

[57] ABSTRACT

A milling cutter includes a housing having an annularly extending groove and a plurality of recesses therein. Interchangeable inserts, each having a curved edge are mounted in the recesses with the curved edges resting in the annularly extending groove. At least one cutting element is mounted in each insert. The inserts are held in the recesses by clamping.

7 Claims, 10 Drawing Figures

MILLING CUTTER

BACKGROUND OF THE INVENTION

This invention relates to a milling cutter with cutting elements inserted and fastened in a hub. More particularly, the present invention relates to such a cutter in which the cutting elements are fastened in inserts carried by the hub. The invention is particularly useful for milling crankshafts, axles or the like.

Milling cutters with firmly attached cutting elements are known. They suffer from the problem that when it becomes necessary to repair one cutting element by welding, the hub is distorted. It is, however, important for cutters of this kind to have an extremely high and accurate degree of concentricity.

For milling crankshafts, it is known to perform the milling operation in several passes, using narrow saw blades. This requires, however, considerable time. Consequently, there has been a desire to use shaping cutters with inserts especially suited for mass production, i.e. for use on assembly lines for work processes which are repetitive. This is especially true of large-scale manufacture of crankshafts for standard types of automobiles. However, expensive cutters of this kind, even small ones, can be very costly.

SUMMARY OF THE INVENTION

It is an object of the present invention to provide a milling cutter in which the setting and number of the cutting elements can be simply adjusted and changed to meet specific conditions.

It is another object of the present invention to provide a milling cutter in which replacement of damaged cutting elements can be effected quickly and without requiring tedious adjustment afterward.

It is an additional object of the present invention to provide a milling cutter in which cutting elements need not be welded and possible distortion of the hub during welding avoided.

It is another object to provide a milling cutter having a given hub which can be used for a wide variety of milling tasks.

The foregoing objects, as well as others which are to become clear from the text below, are achieved according to an exemplary embodiment of the present invention by virtue of the fact that in a milling cutter of the type described hereinabove the cutting elements are mounted in interchangeable inserts, by the fact that the inserts are mounted on the hub in finely machined, especially ground, guides or recesses, and have at least one curved edge resting in a finely machined, especially ground, annular groove, and are held in the guides, or recesses, by means of clamping elements.

The invention ensures that those cutting elements which are required in a given case are mounted in replaceable inserts in such manner that the inserts required in a given case can be prepared and exchanged as necessary, allowing the hub to be used for milling different kinds of crankshafts and the like. This does not result in a reduction of the number of teeth, but the cutter is designed so that it has the same capacity as a single-purpose cutter.

The milling cutter of the present invention can be manufactured in various ways. According to a first embodiment of the invention, it is advantageous if a single-element insert is provided with a shaft, which extends as far as the annular groove, as well as a recess forming a support and rest for a cutting element and with holding means for the cutting element.

To fasten the insert in the hub, it is advantageous if the shaft is provided with a lengthwise slot and a set screw mounted at right angles to the length of the slot.

A further improvement in the fit of the cutter to the milling task at hand is achieved if guides for left-hand and/or right-hand single-element inserts are provided in the hub.

With a larger number of cutting elements, for example for use in cutting oil seals, it is advantageous if two single-element inserts are mounted one directly behind the other.

According to a second embodiment of the invention, recesses for inserts are provided, extending over the width of the hub, for inserts with external guides; the inserts have U-shaped, finely machined, especially ground, guides which fit over the edges of respective ones of the recesses, one of the edges of the individual recesses is provided with steps, and a guided wedge is mounted in the step.

In this manner, the design is advantageously made such that the wedge is provided with finely machined especially ground, edges for the U-shaped guides of the insert and the edges of the wedge rest against the edges of the recess in the hub.

It is particularly advantageous if an approximately semicylindrical guide is provided for the wedge in the hub.

According to the invention, the cutting elements in a cutter of this kind can be arranged in one or more rows. This is particularly advantageous if an oil seal is to be milled as well as a main cut provided. Consequently, according to an additional preferred feature of the invention, the inserts are individually provided with two recesses for corresponding cutter elements, these recesses being offset relative to the central plane of the hub.

Interchangeable stops, guided in the grooves of the inserts, are advantageously provided for the cutting elements.

In order to facilitate the replacement of an insert, according to a further embodiment of the invention, an opening is provided at one lower edge of the insert for inserting a device for removing the insert.

According to yet another embodiment of the present invention, a preferably ground inner guide is provided in the hub, approximately in the central plane thereof, for the guide projection of an insert, and the insert is provided with a wedge which rests against the guide for the insert in the hub, the guide being opposite the guide projection. The axis of a differential screw for the wedge advantageously runs approximately at right angles to the central plane of the hub.

In this embodiment as well, an insert can be provided with recesses for cutting elements, the recesses being displaced relative to the central plane and/or circumference of the hub.

To hold or squeeze the insert according to this embodiment, it is advantageous if a central double-threaded screw is provided in the vicinity of the guide projection, the screw extending into the bottom of a recess in the hub.

Regardless of the design of the specific illustrative embodiments, it is advantageous if the cutting elements associated with an insert or of inserts arranged in a row are mounted at different radial heights relative to the annular groove in the hub. Similarly, it is advantageous to associate insertable shims with the inserts, to change the radial height and/or the axial distance of the cutting elements relative to the central plane of the hub.

According to yet another embodiment of the invention, it is advantageous in many cases if, in addition to the replaceable inserts, cutting elements are also mounted directly on the hub.

BRIEF DESCRIPTION OF THE DRAWINGS

Further advantages and features of the invention will be discussed in more detail with reference to the drawings, which show embodiments in schematic form.

DETAILED DESCRIPTION OF THE PREFERRED EMBODIMENTS

Figure 1:
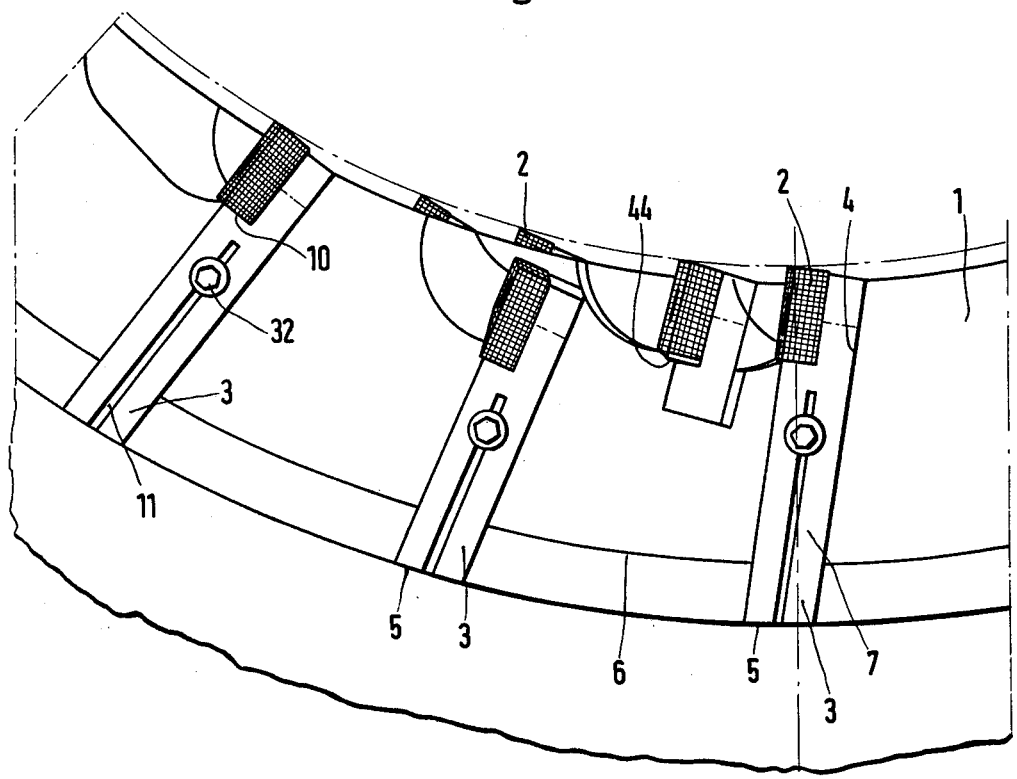
FIG. 1 is a side elevational view of a segment of a first embodiment of a milling cutter according to the invention.
Figure 2:
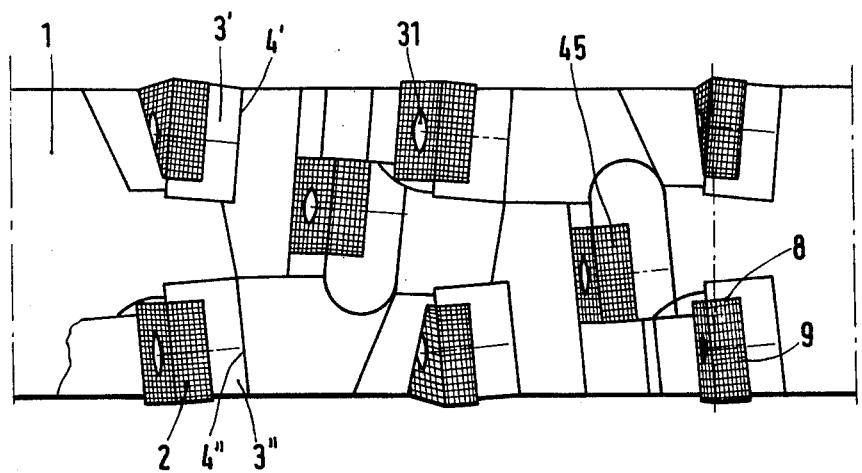
FIG. 2 is a top view of the segment of the milling cutter shown in FIG. 1.

In the embodiment of a milling cutter according to FIGS. 1 and 2, a plurality of finely machined, preferably ground, recess 4 are provided in a concavely curved hub 1; a plurality of single-element inserts 3, each having a shaft 7 extending to an annular groove 6, are inserted in the respective recesses 4. Each shaft 7 is provided at its lower end with a curved edge 5 which matches the curvature of the annular groove 6. Each single-element insert 3 is provided with a recess 10, constituting a stop 8 and a holder 9 for a respective cutting element 2. Each cutting element 2 can be fastened in a conventional manner on or in a respective one of the inserts 3. For example, a central set screw 31 (FIG. 2) is used for fastening.

Each of the single-element inserts 3 can be fastened in the hub by a holding screw, a wedge, a double-threaded screw or, as in the inserts visible in FIG. 1, with the aid of a spreading screw 32, disposed at right angles to a lengthwise slot 11 in the individual shafts 7, and spreads the lengthwise slot in such a manner that each insert 3 is held firmly in a respective one of the recesses 4. To adjust the required depth of the cut to be made, for example for a main cut and for oil seal cuts, the inserts 3 may be provided with shafts 7 of different lengths. In the usual manner, chip deflectors or chip pockets are provided ahead of cutting elements 2.

It is obvious from FIG. 2 that in the exemplary embodiment according to FIGS. 1 and 2, several cutting elements can be mounted some distance apart, side by side, across the width of the hub. The outer cutting elements are held in inserts 3' and 3", which are fastened in corresponding recesses 4' and 4". Cutting elements 45, located somewhat further toward the center of the periphery of the hub 1, may be fastened directly in the hub 1 or by correspondingly wide inserts 3 and appropriate spacers. For width or height adjustment, as shown for the embodiment in FIGS. 1 and 2, shims 44 can be inserted in the recesses 10 for some or all of the cutting elements 2. It is also possible, however, to provide some of the inserts 3 with a greater axial width or with correspondingly larger or wider cutting elements 2. Finally, it is also possible to place the shim 44 beneath or on the lateral supports for the shafts 7.

Figure 3:
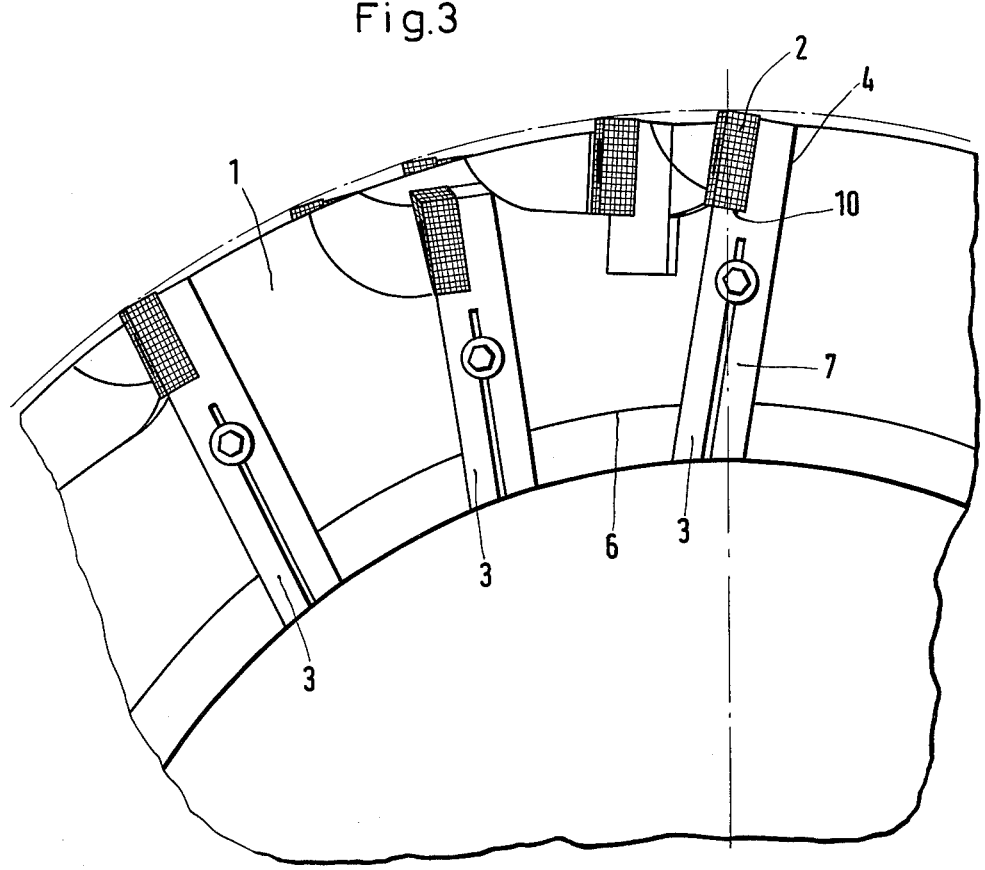
FIG. 3 is a side elevational view of a variant of the embodiment illustrated in FIGS. 1 and 2, having a convex configuration.
Figure 4:
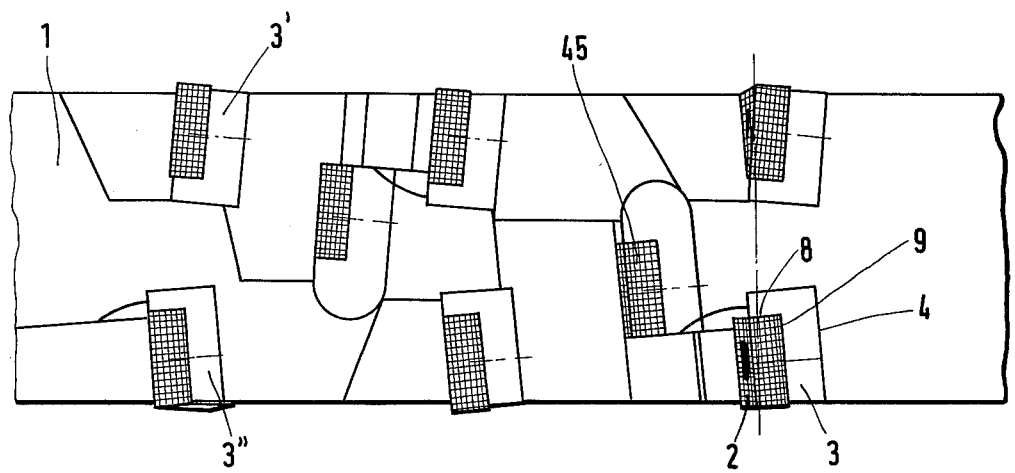
FIG. 4 is a top view of the segment of the milling cutter shown in FIG. 3.

The variant of a milling cutter according to the present invention shown in FIGS. 3 and 4 differs from the embodiment in FIGS. 1 and 2 essentially only in that the hub 1 is convexly curved, as distinguished to concavely curved. The design of the inserts 3 and the cutting elements 2 as well as their mounting and holding is similar to the embodiment illustrated in FIGS. 1 and 2.

Figure 5:
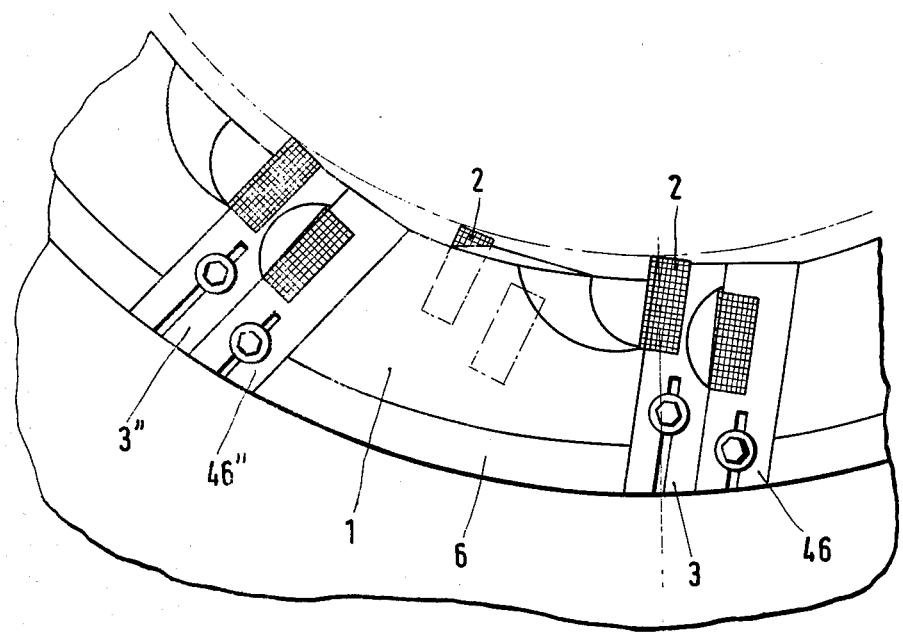
FIG. 5 is a side elevational view of a variant of the first embodiment, having an additional single-element insert.
Figure 6:
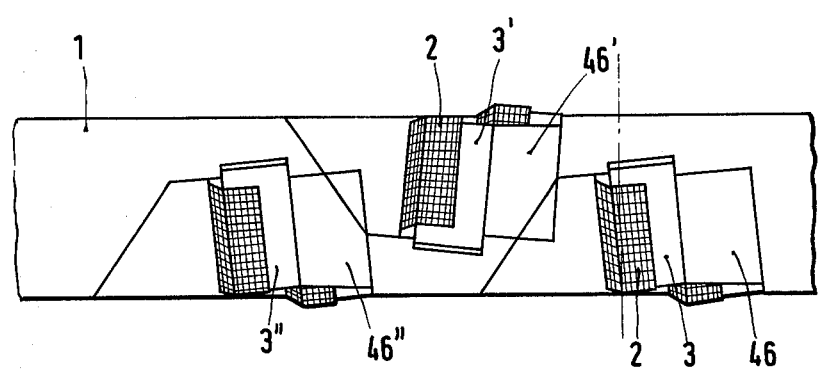
FIG. 6 is a top view of the segment of the milling cutter shown in FIG. 5.

FIGS. 5 and 6 illustrate a further variant of a milling cutter according to the present invention which essentially corresponds to the embodiment and variant shown in FIGS. 1 to 4. In addition, however, in order to increase the number of cutting elements 2 as for example for cutting oil seals in crankshafts and the like, at least one additional single-element insert 46, 46' or 46" is provided directly behind each single-element insert 3, 3' or 3".

Figure 7:
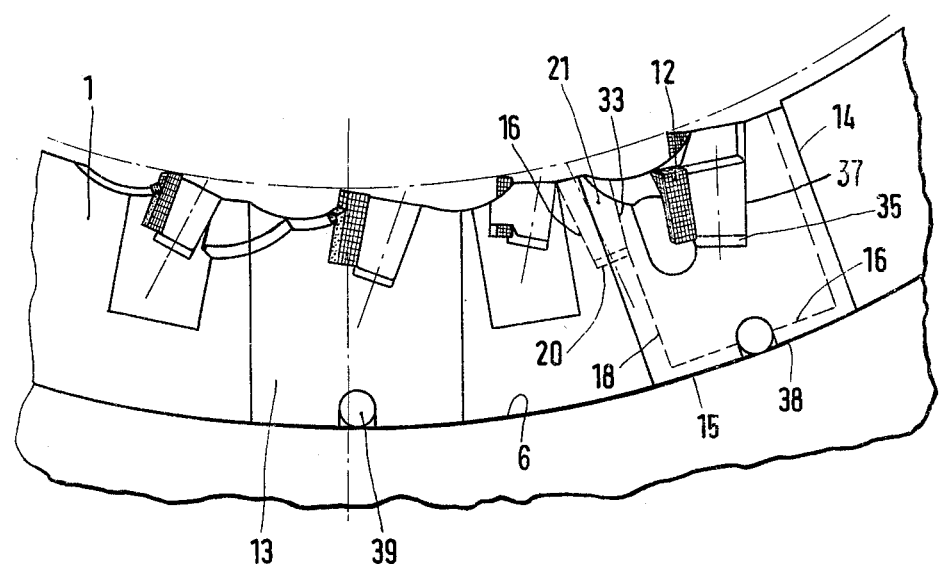
FIG. 7 is a partial side elevational view of a segment of a second embodiment of a milling cutter according to the present invention.
Figure 8:
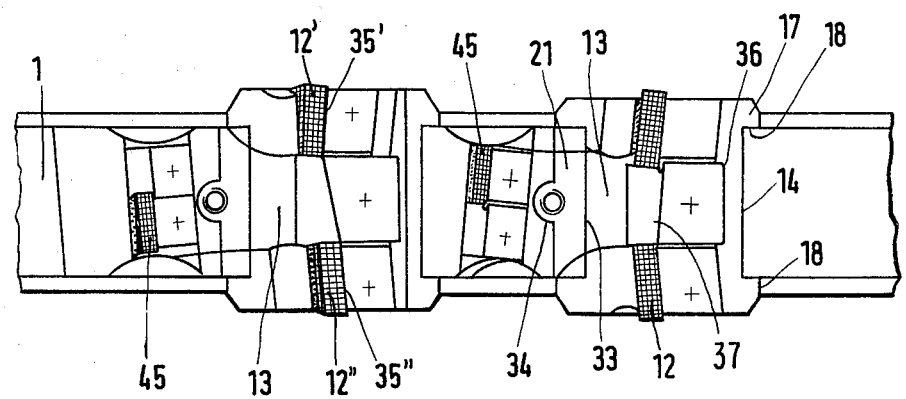
FIG. 8 is a top view of the segment of the milling cutter illustrated in FIG. 7.

FIGS. 7 and 8 illustrate a second embodiment of a milling cutter according to the present invention, wherein inserts 13 are provided with cutting elements 12 in recesses 14. The inserts 13 are likewise provided at their lower ends with curved edges 15, which fit into a preferably ground annular groove 6 of a hub 1. At least one recess 16, which passes diagonally across the width of hub 1, is provided with edges 18 which cooperate with a U-shaped outside guide 17 on the inserts 13. One of the edges of the recess 16 (FIG. 7), as viewed, the left edge of the right insert 13, is provided with a step 20. The design is such that a wedge 21 with likewise preferably ground edges 33 will fit into step 20. The edges 33 of the wedge key 21 fit against the stepped edge 19 in the recess 16. Each insert 13 is held in a corresponding recess 16 by a corresponding wedge 21, which can be fastened in any manner in the hub 1 by a set screw or the like. An opening 39 is provided in the lower edge 38 of each insert 13 to allow insertion of a removing device for aiding in removing the respective inserts 13 from the hub.

In the embodiment according to FIGS. 7 and 8, as is especially clear in FIG. 8, each insert 13 is provided with a groove 36, into which a rigid or replaceable step 37 fits, whereby two recesses 35' and 35" are formed for the cutting elements 12' and 12". In the insert 13 shown to the left in FIG. 8, the two recesses are designated by numerals 35' and 35" and the two cutting elements by numerals 12' and 12". Each recess 14 is surrounded by a corresponding one of the U-shaped outside grooves 17 of an insert 13, as can be seen at the right-hand edge of the insert 13 shown to the right. To form a "tooth" in the cutter, the recess 14 can be made such that a higher cutting element 12 alternates with a lower-lying-cutting element 12' on the top (FIG. 8) and a lower cutting element 12' (right) alternates with a higher cutting element 12" (left) on the bottom. In addition, a cutting element 45 can be mounted offset relative to the central plane of the hub 1.

Each wedge 21 is advantageously provided with a semicylindrical guide 34 which runs in the corresponding stepped edge 19.

An interchangeable stop 37 makes it possible to vary the width of the cut, i.e. the distance of the edges of the cut from the central plane of the hub 1. Similarly, shims or appropriately larger cutting elements 12 can be provided.

Figure 9:
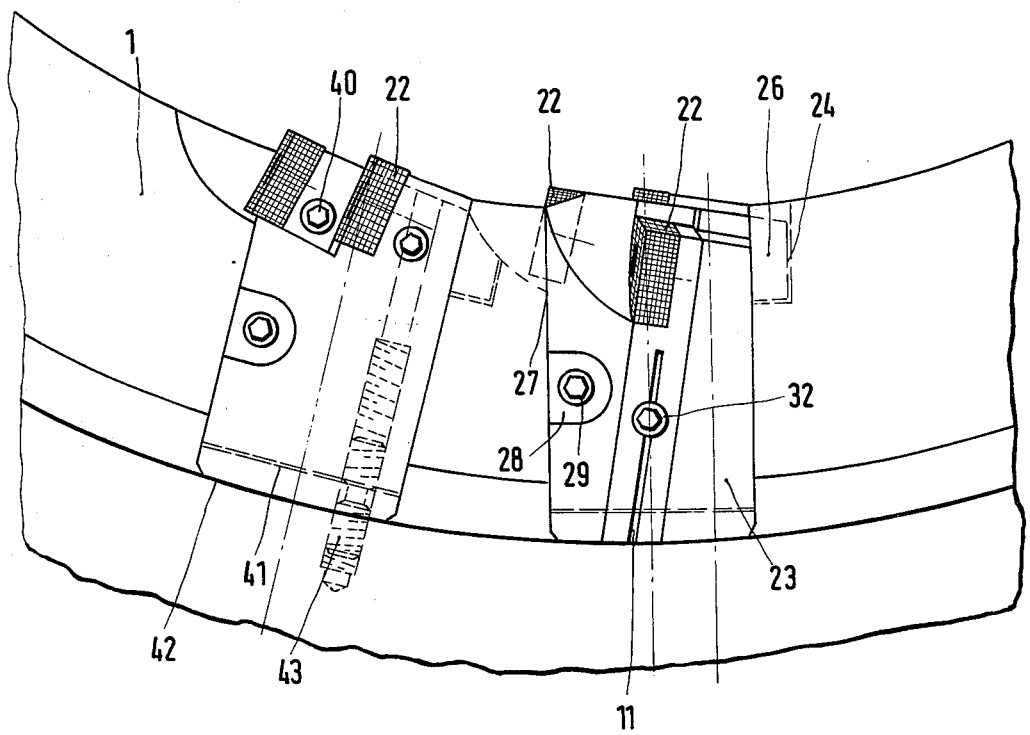
FIG. 9 is a side elevational view of a segment of a third embodiment of a milling cutter according to the present invention.
Figure 10:
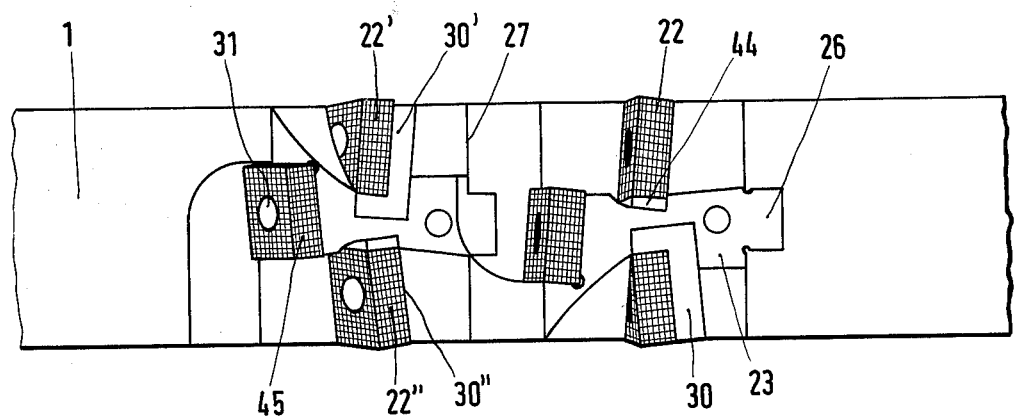
FIG. 10 is a top view of the segment of the milling cutter shown in FIG. 9.

In the third embodiment of a milling cutter according to the present invention, shown in FIGS. 9 and 10, inserts 23 are provided with cutting elements 22, held in recesses 24 in the hub 1. Here each insert 23 again is provided with a curved edge 12 which matches the curve of an annular groove. By means of a guide projection 26, which extends over a portion of the length of each insert 23, each insert 23 is appropriately guided in a respective recess 24. A guide 27 is provided on the opposite side. In order to fasten individual inserts 23 into corresponding recess 42, in this exemplary embodiment a wedge 28 is employed which acts against one wall of the recess 42 by means of a differential screw 29.

For additional fastening, as shown at the left in FIG. 9, a differential screw 43 may be used, which fits into an insert 23 and extends approximately radially into the bottom 41 of the recess 42 and can be screwed together with the hub 1. The differential screw 43 makes it possible either to screw an insert 23 into the hub 1 or to force it out of the recess 42.

In the right-hand insert 23 in FIG. 10, a shim 44 is shown for example, which can be used to increase the distance between one of the cutting elements 22 and the central plane of the hub 1.

In the right-hand insert 23 in FIG. 9, a similar fastening means is provided, with a lengthwise slot 11 and a spreading screw 32, as in the embodiment according to FIG. 1

In the second and third embodiments as well, chip guides a chip-receiving spaces are provided ahead of the cutting elements 12 and 22.

In all of the embodiments, as described hereinabove, additional cutting elements may be provided, these elements being fastened directly in the hub 1. Advantageously, these directly fastened cutting elements 45 are disposed in the vicinity of the central plane of the hub 1, as shown for example in FIG. 8.

The embodiment according to the invention makes it possible to mount optionally in the hub 1, inserts 3, 13 and 23 at various widths. The cutting elements in the design according to the invention can therefore easily be exchanged individually. Supports and stops in the form of shims can be installed easily in order to change the width and/or the depth of the cuts to be made. The components can be inserted as desired. This makes it possible, for example, initially to use only a few teeth, and then later, during subsequent mass production of a standard crankshaft or the like, to install the full complement of cutters in the milling cutter.

The teeth formed by the individual cutting elements can be arranged in appropriately high or low settings for simultaneous machining of crankpins and journals on crankshafts.

The change in the height and/or width of the individual cuts may be effected in a simple fashion by shims 44, wider inserts, or even larger cutting elements, as well as by inserts with shafts of different lengths.

Instead of a complete annular groove 6, circular-segment-shaped grooves or polygonal grooves or groove segments may be provided in the hub 1.

The invention is not limited to the embodiments and variants described and shown. It is to be appreciated that numerous changes and modifications can be made without departing from the spirit and scope of the invention, its scope being defined by the appended claims.

What is claimed is:

1. A milling cutter form milling workpieces, the cutter comprising:
   a hub having an annularly extending circularly arched groove and a plurality of recesses therein;
   a plurality of interchangeable inserts each having a circularly arched edge, each insert being mounted in one of said recesses with its said circularly arched edge resting in said annularly extending circularly arched groove;
   clamping means for holding said inserts in said recesses;
   a plurality of cutting elements mounted in said interchangeable inserts;
   special recesses for inserts with outside guides provided in said hub and extending over its width;
   inserts provided with U-shaped, finely machined, especially ground guides fitting over edges of said special recesses, one of said edges of at least one of said special recesses being provided with at least one step and
   a wedge guided in said step.

2. A milling cutter according to claim 1, wherein said wedge is provided with ground edges for said U-shaped guides, edges of said wedge fitting against edges of its corresponding said special recess in said hub.

3. A milling cutter according to claim 1, including a substantially semicylindrical guide in said hub for said wedge.

4. A milling cutter according to claim 1, wherein at least some of said inserts are provided with two recesses for receiving cutting elements, said two recesses being displaced relative to the central plane of the hub.

5. A milling cutter according to claim 4, including a replaceable stop for at least some of said cutting elements.

6. A milling cutter according to claim 1, including an opening provided on one lower edge of at least some of said inserts for the insertion of a device for removing this insert from said hub.

7. A milling cutter for milling workpieces, the cutter comprising:
   a hub having an annularly extending circularly arched groove and a plurality of recesses therein;
   a plurality of interchangeable inserts each having a circularly arched edge, each insert being mounted in one of said recesses with its said circularly arched edge resting in said annularly extending circularly arched groove;
   clamping means for holding said inserts in said recesses; and
   a plurality of cutting elements mounted in said interchangeable inserts, and wherein said cutting elements are arranged in a sequence and are disposed at different radial heights relative to said annular groove of said hub.

* * * * *